INVENTOR.
HOMER J. SHAFER
BY Ely, Frye & Hamilton
ATTORNEYS

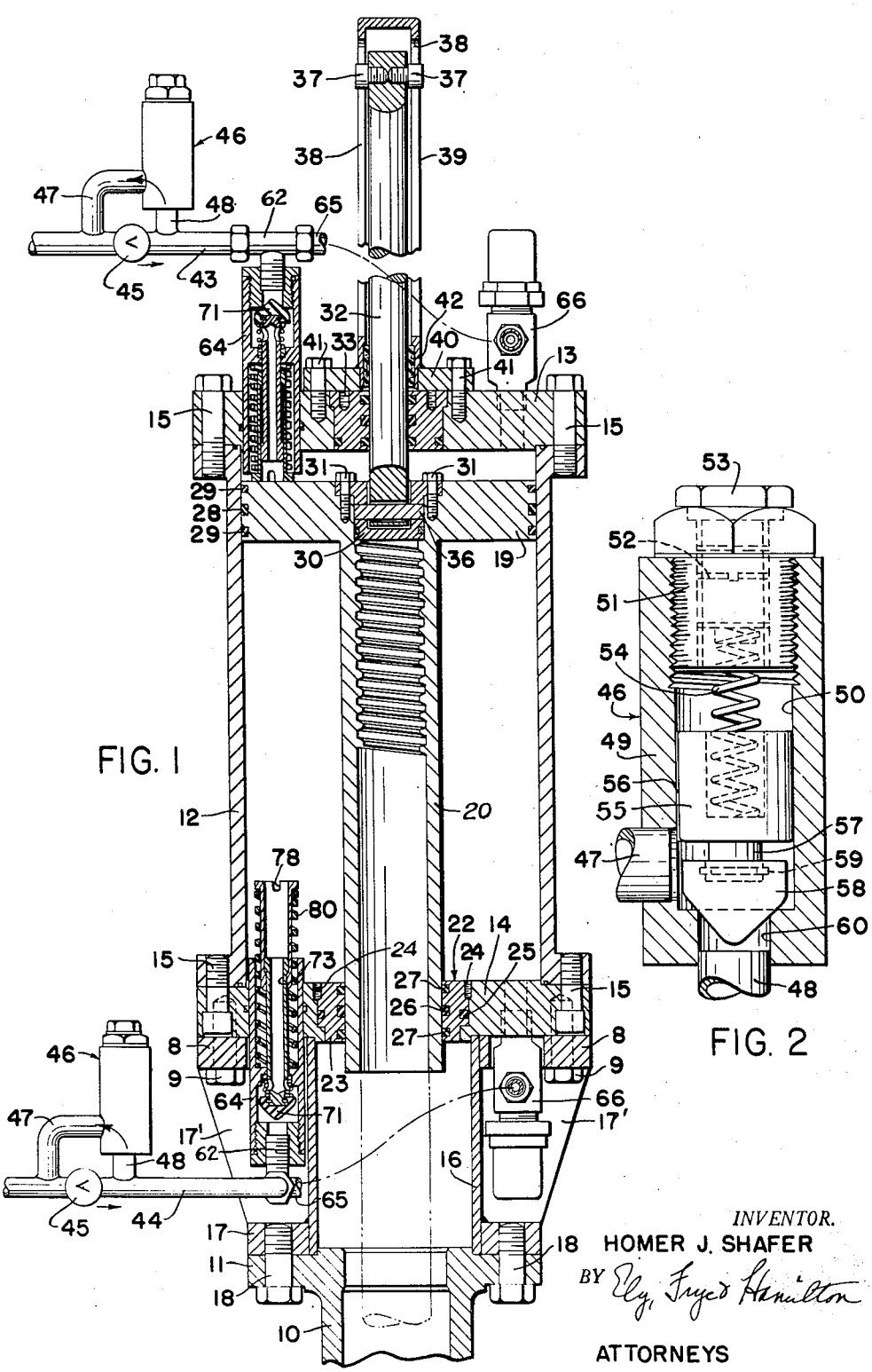

United States Patent Office 2,783,742
Patented Mar. 5, 1957

2,783,742
AUTOMATIC PRESSURE REDUCING MEANS FOR HYDRAULIC GATE VALVE OPERATOR

Homer J. Shafer, Mansfield, Ohio, assignor to Shafer Valve Company, Mansfield, Ohio, a corporation of Ohio Application November 22, 1954, Serial No. 470,324

8 Claims. (Cl. 121—38)

The invention relates generally to mechanism for opening and closing gate valves, and more particularly gate valves which embody elements which are seated by a wedging action to fully close the valve and may also be seated by a wedging action in the fully open position of the valve.

Gate valves which are seated by a wedging action of the valve elements not only require substantial closing force to accomplish the final seating of the wedging elements, but when the valve is opened more force is often required to start the unseating action than was required to complete the seating action. This may be due to the inertia of the valve elements under line pressure, or to freezing or corrosion of the elements in seated position. As a consequence of this condition an excessive amount of force is required to operate gate valves employing a wedging action.

The purpose of the present invention is to provide a novel operator mechanism having an excess of closing force or pressure which automatically decreases during the final seating action, so that the unseating action in the opposite direction can be started easily with a force equal to the normal closing force.

Another object is to provide a hydraulic piston type operator for a gate valve with improved means for automatically decreasing the operating pressure during the final closing stroke, and for starting the return stroke under full operating pressure.

A further object is to provide a hydraulic piston type gate valve operator which is readily adapted for connection to any source of hydraulic power, and which is compact and inexpensive.

The purposes of the invention are accomplished by the improved construction shown by way of example in the accompanying drawings, and described in detail herein.

Various modifications and changes in details are included in the scope of the invention as defined in the appended claims.

The invention consists in introducing hydraulic fluid through a snubber valve into one end of the operating cylinder and exhausting it from the other end through a snubber valve, the valves being adapted alternately to be closed by contact with the operating piston near the end of its stroke, and a pressure relief valve in each end of the cylinder operable at reduced pressure for exhausting the cylinder when the snubber valve at that end is closed by the piston.

Referring to the drawings:

Fig. 1 is a fragmentary vertical sectional view through the cylinder of a piston type gate valve operator embodying the invention, showing the piston at the upper end of its stroke.

Fig. 2 is an enlarged detached sectional view of one of the relief valves connected in the hydraulic lines which are connected to the snubber valves in the ends of the cylinder.

Figures 3, 4:
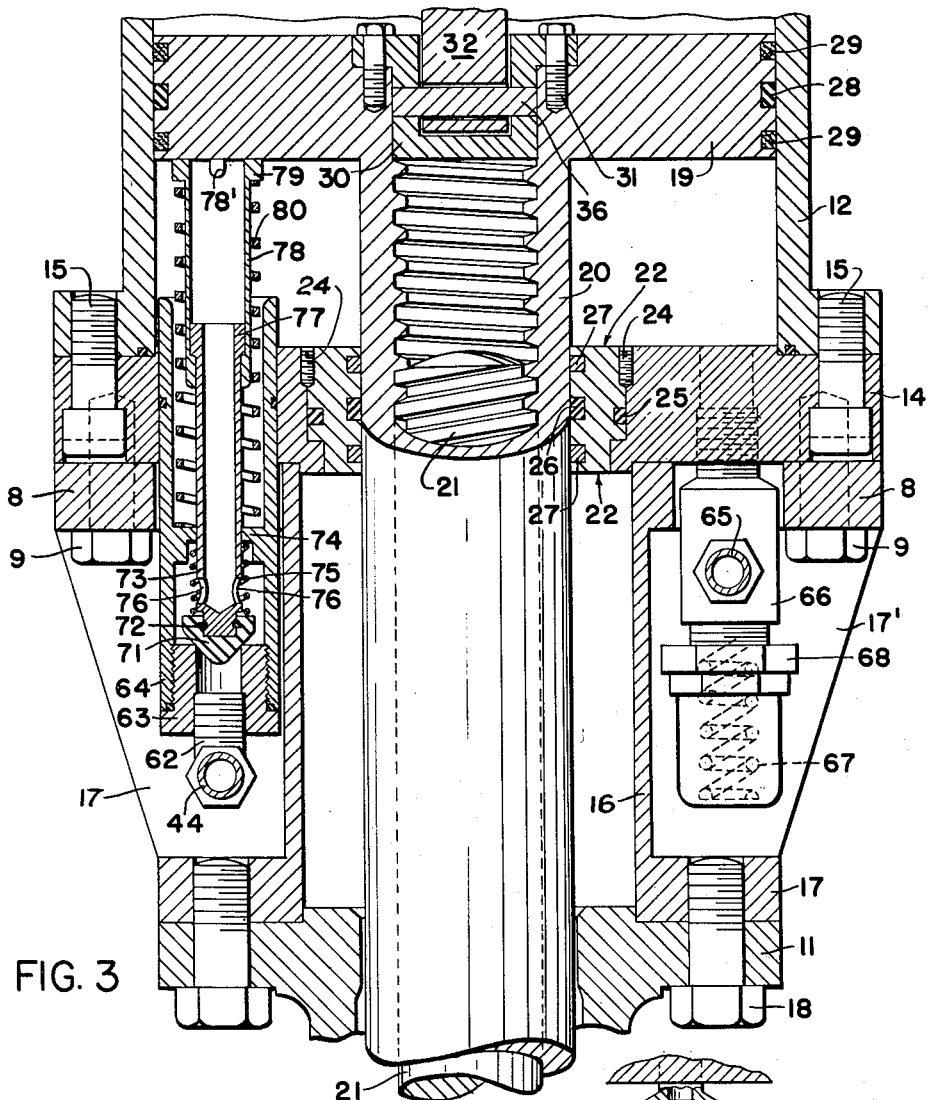
Fig. 3 is an enlarged view similar to Fig. 1, showing the piston near the lower end of its stroke.
Fig. 4 is a fragmentary view showing the manner of connecting the pressure relief valves in the ends of the cylinder to the hydraulic lines which are connected to the snubber valves.

In Fig. 1, the improved operator mechanism is shown mounted on top of the valve stem housing 10 of a conventional gate valve, said housing having an annular flange 11 at its upper end. The cylinder 12 of the operator has upper and lower end plates 13 and 14 respectively, which may be secured to annular flanges on the ends of the cylinder by bolts 15. A spacer sleeve 16 supports the lower end plate 14 on the housing 10, said sleeve being welded or otherwise secured at its upper end to plate 14, and at its lower end to a ring 17 which is secured to the flange 11 by bolts 18. The ring 17 preferably has vertical support flanges 17' with ears 8 at their upper ends connected to the end plate 14 by bolts 9.

A piston 19 is slidably mounted in the cylinder 12 and has a hollow internally threaded piston rod 20 into which the valve stem 21 is threaded, as indicated in full lines in Fig. 3. The piston rod 20 is slidable through a sealing gland 22 in the lower plate 14, for passing into the housing 10 when the piston is lowered. The valve stem is secured at its lower end to conventional valve closing elements (not shown) of the wedging type, so that the valve is closed when the piston is lowered, and opened when the piston is raised.

The sealing gland preferably includes a bushing 23 secured in the end plate 14 by set screws 24, and having an O-ring seal 25 between the end plate and bushing. Around the piston rod the bushing is provided with a central O-ring seal 26 and upper and lower wiper rings 27 of felt and the like. Similarly, the piston 19 has a central O-ring seal 28 abutting the cylinder 12, with felt wiper rings 29 above and below, to provide a liquid-tight seal between the piston and cylinder.

The upper side of the piston 19 had a mounting block 30 secured in its central portion by screws 31, and the block 30 has a socket receiving the bottom end of a vertically extending indicating rod 32 which projects upwardly through the sealing gland 33 in end plate 13. The sealing gland 33 comprises a bushing having a central O-ring seal with upper and lower wiper rings in an arrangement substantially the same as bushing 23.

The lower end of the indicating rod 32 is preferably non-rotatively secured in the mounting block 30 by means of a pin 36, and the upper end of the rod has diametrically opposite cap screws 37 screwed therein, the heads of which are slidable in vertically extending guide slots 38 of a tube 39. The tube 39 is preferably welded to a guide flange 40 secured to the end plate 13 by screws 41, and may enclose a felt gasket 42 around the rod 32. The position of the screws 37 in the slots 39 indicates the raised or lowered position of the piston 19 and the valve stem 21 attached thereto, and the sliding engagement of the screws in slots 38 prevents rotation of the piston as it reciprocates.

A conduit 43 is connected to the upper end of the cylinder 12, and a similar conduit 44 is connected to the lower end of the cylinder. These conduits alternately supply and exhaust pressure fluid to and from the ends of the cylinder as the piston is reciprocated, and fluid under pressure may be supplied to one end or the other from a source of pressure, which may be a pump or the pipe line in which the gate valve is located, or a tank containing fluid under pressure.

Each of the conduits 43 and 44 is provided with a check valve permitting flow from the power source toward the cylinder 12 and preventing flow in the opposite direction, and with a relief valve for by-passing the check valve and permitting flow from the cylinder to exhaust only when the pressure exceeds the predetermined amount for which the relief valve is set. This acts as a hydraulic latch for holding the piston 19 at any intermediate position to maintain the gate valve in partially open position. The check valves in the conduits 43 and 44 are indicated at 45 and the relief valves at 46. The valves 46 are connected into the conduits 43 and 44 on opposite sides of the check valves 45 by conduits 47 and 48.

As shown in Fig. 2, the relief valve 46 includes a tubular housing 49 having a bore 50 which is internally threaded at one end for receiving a tubular nut 51. The nut has an internally threaded bore in which an adjusting nut 52 is screwed, and a plug 53 may also be screwed in the outer end of the bore of the nut to enclose the nut 52. The adjusting nut 52 abuts one end of a helical compression spring 54, the other end of which is received in a socket in the guide element 55 slidable in the bore 50 of the housing and having one or more longitudinal grooves 56 in its outer surface to pass fluid.

The lower end of guide element 55 has a reduced shaft portion 57 on which a conical head 58 is detachably mounted by a snap ring 59, and the head is preferably resilient oil-resistant material, such as synthetic plastic material known as "neoprene." The resilient head 58 normally seats in the upper end of a port 60 connected to conduit 48, and the conduit 47 communicates with the bore 50 below the guide element 55.

Thus, pressure fluid flowing in either conduit 43 or 44 can flow toward the cylinder through check valve 45 but not through relief valve 46 because fluid entering the relief valve through conduit 47 acts in the same direction as spring 54 to seat the head 58 on port 60. When the flow is in the opposite direction and the pressure is sufficient to overcome the resistance of spring 54 and unseat the head 58, fluid can flow through conduits 48 and 47 and by-pass the check valve 45. Accordingly, when the piston is stopped at an intermediate position it is held in that position because any movement of the piston would cause flow from the exhaust side of the cylinder, and such flow is prevented by the spring 54 until sufficient pressure is introduced into the other side of the cylinder to overcome the resistance of spring 54.

The conduits 43 and 44 are connected to the ends of cylinder 12 by means of T's 62, the stems of which are screwed into bushing 63 which are in turn screwed into the ends of snubber valve housing sleeves 64 extending through the end walls 13 and 14 of the cylinder. The T's 62 are also connected by conduits 65 to the side openings of two identical pressure relief valves 66 (Fig. 4), which are also connected through the end plates with the cylinder 12. These pressure relief valves 66 are of conventional construction, and include springs 67 which may be adjusted by nuts 68 to hold the valve elements 69 closed against flow out of the cylinder with a predetermined pressure. Flow into the cylinder through the relief valves is prevented by the valve elements 69.

The construction of the snubber valves within the sleeves 64 is identical, and only one will be described in detail, with particular reference to Fig. 3. The snubber valve element for seating on the inner end of the bushing to shut off flow to the T 62 may be a cone 71 of resilient "neoprene" or the like detachably mounted by a snap ring 72 on the outer end of an inner stem or tube 73 extending slidably through a partition wall 74 in the central part of the sleeve 64. A helical spring 75 acts between the partition wall 74 and the cone 71 normally to seat the cone on the bushing 63 and shut off flow to the T 62. Immediately adjacent to the cone 71 are apertures 76 extending laterally through tube 73.

The other end of tube 73 has an enlarged shoulder 77 telescopically received in an outer tube 78 which extends axially of the sleeve 64 from within the sleeve into the cylinder 12. The tube 78 has an inner shoulder at one end for abutting shoulder 77 on tube 73 to limit the relative extensible movement between tubes 73 and 78. The opposite end of tube 78 has an annular shoulder 79, which serves as an abutment for one end of a relatively strong helical spring 80 interposed between partition wall 74 and shoulder 79 and urging the tube 78 outwardly from sleeve 64.

The spring 80 is much stronger than spring 75 so that when spring 80 is free to expand it will extend tube 78 to engage shoulder 77 and compress spring 75 to lift the cone 71 off its seat, to the position of the lower snubber valve as shown in Fig. 1. After the piston 19 engages the upper end of tube 78 and compresses spring 80 a certain predetermined amount as shown in Fig. 3, the pressure of spring 75 acts to seat the valve cone 71 on bushing 63 and close the passage to the T 62. After the piston has engaged tube 78 and before the valve 71 closes, if there is any air trapped between the piston and the bottom of cylinder 12, some of it can escape through the notches 78' in the top of tube 78 and out through ports 76. In this way several strokes of the piston will serve to remove substantially all of any trapped air in the cylinder. Otherwise, when the piston has completed its stroke and the hydraulic pressure on the upper side of the piston is relieved, the trapped air would tend to raise the piston.

In the operation of the improved mechanism, assuming the piston 19 to be in the fully raised position of Fig. 1 and it is desired to lower the piston and close the gate valve connected thereto, full line pressure is introduced through conduit 43 to the upper end of the cylinder 12, and conduit 44 is connected to exhaust. This full line pressure is preferably substantially in excess of what is considered a normal operating pressure for the main valve, so that if the valve has wedgably engaged elements in its open position, those elements will be disengaged by full line pressure. In the fully raised position of piston 19, it is abutting the outer tube 78 and compressing the larger spring, allowing the smaller spring to close the snubber valve, but when full line pressure is introduced into line 43, the pressure of the smaller spring is overcome, opening the valve and allowing fluid to flow through the ports 76 into the inner tube 73 and thence into the upper end of the cylinder to move the piston downwardly. Line pressure in conduit 65 acts to hold the upper relief valve 66 closed against the line pressure in cylinder 12.

As the piston lowers, fluid in the lower part of the cylinder can exhaust through the inner tube 73 of the lower snubber valve, around the valve cone 71 which is held open by spring 80, and into conduit 44. Now, when the piston approaches the end of its downward stroke which would be about the same time as the main valve elements begin to wedgably engage each other, the piston abuts the upper end of the outer tube 78 of the lower snubber valve and overcomes the pressure of spring 80, allowing spring 75 to close the valve 71. The differential pressure still moving the piston downwardly forces the pressure relief valve 66 in bottom plate 14 to open against the pressure of its spring and exhaust fluid through conduit 65 and the piston completes its downward stroke at a pressure reduced by the amount of pressure at which the relief valve spring is set.

For example, if the full line pressure entering through conduit 43 is 800 p. s. i., when the piston engages the outer tube 78 and overcomes the pressure of spring 80, spring 75 closes the valve 71 and the piston continues to move downwardly. However if the pressure relief valve 66 is set to open at 400 p. s. i., once the valve 71 has been closed and the exhausting fluid has opened the pressure relief valve, the piston completes its downward stroke at a reduced pressure of 800 p. s. i. minus 400 p. s. i., or 400 p. s. i. Thus, the final seating action of the wedging elements of the main valve is accomplished at 400 p. s. i., which is a normal closing pressure.

On reversing the flow to raise the piston, the full line pressure is introduced through conduit 44 to open the lower snubber valve and start the piston upwardly, so that the full line pressure of 800 p. s. i., for example, is used to unseat the valve elements which were seated by a pressure of only 400 p. s. i., thus insuring proper operation of the main valve in spite of sticking or corrosion of the elements. When the full line pressure enters the lower end of the cylinder 12, it cannot act to open the relief valve 66, because full line pressure is being applied to the other side of the valve through conduit 65 and the valve is held shut by its spring 67.

When the piston approaches the end of its upward stroke it contacts the sleeve 78 of the upper snubber and closes the snubber valve, after which the effective opening pressure transmitted by the piston to the main valve is reduced by the amount at which the upper pressure relief valve 66 is set, in the same manner as occomplished by the lower pressure relief valve 66 at the end of the downward stroke.

The improved hydraulic operating mechanism is compact and inexpensive to make and install, and is adapted for use with almost any available source of hydraulic power.

What is claimed is:

1. In a hydraulic operator for a gate valve having a valve stem, including a hydraulic cylinder having end walls, and a piston reciprocable in said cylinder and operatively connected to said valve stem, means at each end of said cylinder for reducing the pressure transmitted to the valve stem at the end of each piston stroke, said means including a snubber valve mechanism in the cylinder end wall having a conduit for connecting the cylinder alternately with a source of pressure fluid and with exhaust, spring-actuated means normally holding said snubber valve open and extending into the cylinder for engagement with said piston to close the snubber valve near the end of the piston stroke, a pressure relief valve in the cylinder end wall set to open at less than the source pressure, said pressure relief valve having outlet means connected outside of the cylinder to said conduit, and constituting the sole connection between the cylinder and exhaust when the snubber valve is closed, and exterior means connected to the snubber valve permitting free flow to the snubber valve, and preventing flow from the snubber valve until a predetermined pressure is reached.

2. In a hydraulic piston and cylinder operator for a gate valve, means mounted in the end of the cylinder for reducing the pressure transmitted by the piston at the end of its stroke, said means including a tubular housing extending into said cylinder and connected at its outer end to a fluid pressure conduit, a snubber valve in said conduit for completely shutting off flow from the cylinder, an inner stem in said housing connected to said snubber valve, a first spring urging said valve to closed position, a tube telescopically movable over said stem and extensible into said cylinder, and a relatively strong second spring normally holding said tube extended and the snubber valve open against the pressure of said first spring, said tube being adapted to engage the piston near the end of its stroke allowing said first spring to close the snubber valve and said tube to retract into said housing during the remaining part of the piston stroke, and a pressure relief valve in the end of said cylinder to exhaust fluid therefrom when the pressure therein exceeds a predetermined amount.

3. In a hydraulic piston and cylinder operator for a gate valve, means mounted in the end of the cylinder for reducing the pressure transmitted by the piston at the end of its stroke, said means including a tubular housing extending into said cylinder and connected at its outer end to a fluid pressure conduit, a snubber valve in said conduit for shutting off flow from the cylinder, an inner tube in said housing connected to said snubber valve and adapted to conduct fluid into said cylinder, a spring around said tube urging said valve to closed position, an outer tube telescoped over said inner tube and extensibly connected thereto for extension into said cylinder for engagement with the piston near the end of its stroke, and a relatively strong spring normally holding said outer tube extended and the snubber valve open, said outer tube being adapted to engage the piston near the end of its stroke to retract into said housing and release the snubber valve to the closing action of the weaker spring.

4. In a hydraulic piston and cylinder operator for a gate valve, means mounted in the end of the cylinder for reducing the pressure transmitted by the piston at the end of its stroke, said means including a tubular housing extending into said cylinder and connected at its outer end to a fluid pressure conduit, a snubber valve in said conduit for shutting off flow from the cylinder, an inner tube in said housing connected to said snubber valve and adapted to conduct fluid into said cylinder, a first spring around said tube urging said valve to closed position, an outer tube telescoped over said tube and extensibly connected thereto for extension into said cylinder to engage the piston near the end of its stroke, said outer tube having openings at its upper end permitting fluid flow when engaged with the piston, and a relatively strong spring normally holding said outer tube extended and the snubber valve open, said outer tube being retracted by the piston near the end of its stroke to release the snubber valve to the closing action of said first spring.

5. In a hydraulic piston and cylinder operator for a gate valve, means mounted in the end of the cylinder for reducing the pressure transmitted by the piston at the end of its stroke, said means including a tubular housing extending into said cylinder and connected at its outer end to a fluid pressure conduit, a snubber valve in said conduit for shutting off flow from the cylinder, an inner tube in said housing connected to said snubber valve and adapted to conduct fluid into said cylinder, a spring around said tube urging said valve to closed position, an outer tube telescoped over said inner tube and extensibly connected thereto for extension into said cylinder for engagement with the piston near the end of its stroke, a relatively strong spring normally holding said outer tube extended and the snubber valve open, said outer tube being adapted to engage the piston near the end of its stroke to retract into said housing and release the snubber valve to the closing action of the weaker spring, and a pressure relief valve in the end of said cylinder to exhaust fluid therefrom when the pressure exceeds a predetermined amount.

6. In a hydraulic piston and cylinder operator for a gate valve, means mounted in the end of the cylinder for reducing the pressure transmitted by the piston at the end of its stroke, said means including a tubular housing extending into said cylinder and connected at its outer end to a fluid pressure conduit, a snubber valve in said conduit for shutting off flow from the cylinder, an inner tube in said housing connected to said snubber valve and adapted to conduct fluid into said cylinder, a first spring around said tube urging said valve to closed position, an outer tube telescoped over said tube and extensibly connected thereto for extension into said cylinder to engage the piston near the end of its stroke, said outer tube having openings at its upper end permitting fluid flow when engaged with the piston, a relatively strong spring normally holding said outer tube extended and the snubber valve open, said outer tube being retracted by the piston near the end of its stroke to release the snubber valve to the closing action of said first spring, and a pressure relief valve in the end of said cylinder to exhaust fluid therefrom when the pressure exceeds a predetermined amount.

7. In a hydraulic piston and cylinder operator for a gate valve, means mounted in the end of the cylinder for reducing the pressure transmitted by the piston at the end of its stroke, said means including a tubular housing extending into said cylinder and connected at its outer end to a fluid pressure conduit, a snubber valve in said conduit for shutting off flow from the cylinder, an inner tube in said housing connected to said snubber valve and adapted to conduct fluid into said cylinder, a spring around said tube urging said valve to closed position, an outer tube telescoped over said inner tube and extensibly connected thereto for extension into said cylinder for engagement with the piston near the end of its stroke, a relatively strong spring normally holding said outer tube extended and the snubber valve open, said outer tube being adapted to engage the piston near the end of its stroke to retract into said housing and release the snubber valve to the closing action of the weaker spring, and a pressure relief valve in the end of said cylinder to exhaust fluid therefrom when the pressure exceeds a predetermined amount, said pressure relief valve being connected outside of the cylinder to said fluid pressure conduit.

8. In a hydraulic piston and cylinder operator for a gate valve, means mounted in the end of the cylinder for reducing the pressure transmitted by the piston at the end of its stroke, said means including a tubular housing extending into said cylinder and connected at its outer end to a fluid pressure conduit, a snubber valve in said conduit for shutting off flow from the cylinder, an inner tube in said housing connected to said snubber valve and adapted to conduct fluid into said cylinder, a first spring around said tube urging said valve to closed position, an outer tube telescoped over said tube and extensibly connected thereto for extension into said cylinder to engage the piston near the end of its stroke, said outer tube having openings at its upper end permitting fluid flow when engaged with the piston, a relatively strong spring normally holding said outer tube extended and the snubber valve open, said outer tube being retracted by the piston near the end of its stroke to release the snubber valve to the closing action of said first spring, and a pressure relief valve in the end of said cylinder to exhaust fluid therefrom when the pressure exceeds a predetermined amount, said pressure relief valve being connected outside of the cylinder to said fluid pressure conduit.

References Cited in the file of this patent

UNITED STATES PATENTS

| | | |
|---|---|---|
| 840,877 | Steedman | Jan. 8, 1907 |
| 917,642 | McElroy | Apr. 6, 1909 |
| 1,577,446 | Brown | Mar. 23, 1926 |
| 1,807,231 | Weeks | May 26, 1931 |
| 1,833,216 | Hanna | Nov. 24, 1931 |
| 2,114,334 | Conklin | Apr. 19, 1938 |